3,583,070
MASTICATION BAR FOR DENTURES
Raymond G. C. Nietert and Mildred M. Nietert, both of 1708 S. Missouri, Roswell, N. Mex. 88201
Filed Oct. 27, 1969, Ser. No. 869,517
Int. Cl. A61c 13/00
U.S. Cl. 32—8                                       10 Claims

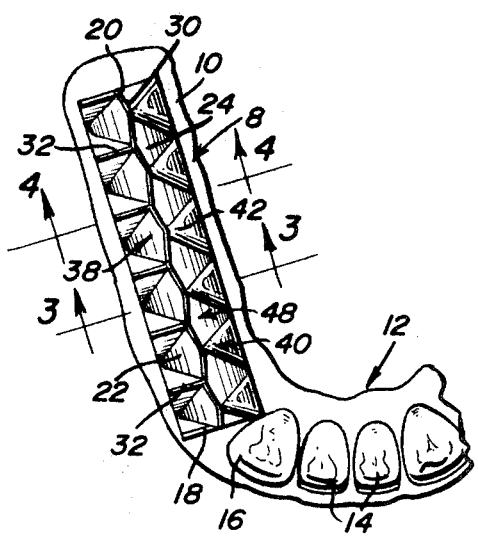
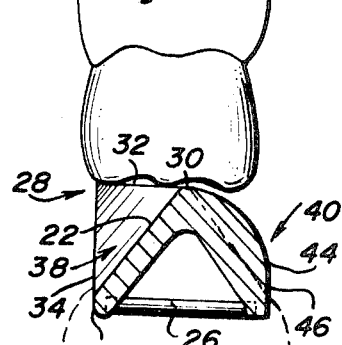
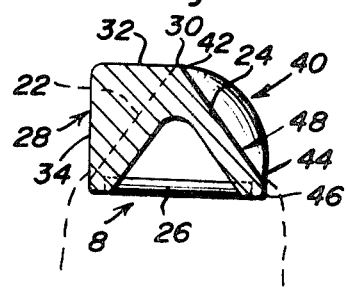
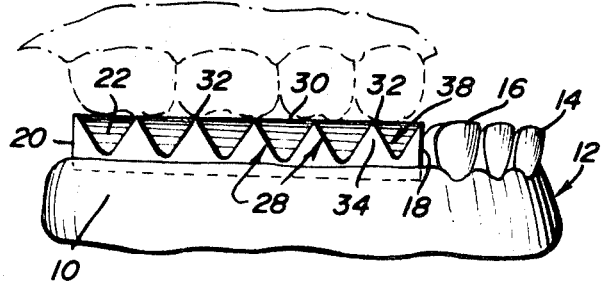
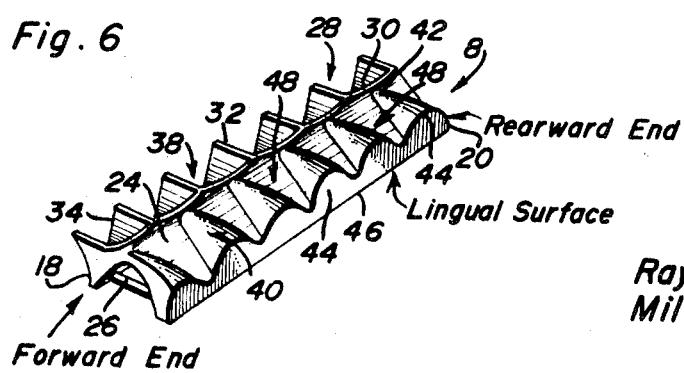
Raymond G.C. Nietert
Mildred M. Nietert
INVENTORS

United States Patent Office 3,583,070
Patented June 8, 1971

ABSTRACT OF THE DISCLOSURE

A one piece masticating insert which can be embedded in a denture, upper, lower, or partial, and which functions in lieu of the customary artificial bicuspid and molar teeth. It comprises a stainless steel or an equivalent elongated bar which is V-shaped in transverse section, is open-ended and has sloping flanges or surfaces whose adjacent ends are united by a sinuous cutting ridge. The outward or buccal surface has V-shaped embossments providing a first row of teeth and the inward lingual surface has substantially semi-conoidal embossments providing a companion or second row of teeth which have convexly contoured surfaces. These two rows of coordinating teeth coact in opposition to either upper or lower blunt cusp denture teeth.

---

The present invention relates to certain new and useful improvements in upper, lower and partial dentures which are customarily characterized by coordinating artificial teeth and pertains, more particularly, to one or more masticating inserts, each of which lends itself to incorporation in the inward end portion of the denture and which is such in construction and purpose that it serves in lieu of the customary artificial bicuspid and molar teeth.

Persons conversant with the state of the art to which the invention relates are aware that it is not new, generally stated, to replace the bicuspid and molar teeth with stainless steel and equivalent masticating bars. For background information the reader, if so desired, may refer to and evaluate the applicability here of a patent to Walter A. Bader 2,669,021 dated Feb. 16, 1954 and which has to do with a V-shaped member or bar, the flanges of which are embedded and anchored in the denture material and whose vertex is sharpened to provide a cutting and masticating edge. It is known too that prior art adaptions invoke the us of integral outstanding segments or components which constitute artificial teeth and which are interrelated with the respective buccal and lingual surfaces for masticating needs. It follows that it is an object of the present invention to improve upon the Bader artificial denture patent and other prior art adaptions by offering an innovation which provides for practical and feasible replacement of the bicuspid and molar teeth and wherein the thus improved arrangement of teeth permits the same to be effectively used in opposition to either upper or lower substantially blunt or generally flat cusp denture teeth.

In carrying out the principles of the instant invention the construction and arrangement of the coordinating features is such that mastication of food is cut instead of being mashed and, at the same time, the biting force is effectually applied in a manner to afford comfort to the wearer while chewing. Then too, the construction and arrangement of cooperating features enables the food to be shunted away from the principal cutting surfaces by way of channeling spillways, whereby to avoid objectionable building up of food and deposits between the teeth on the sloping surfaces of the novel tooth-equipped bar.

Briefly, the herein disclosed concept pertains to a unique food masticating insert, more particularly, an adaptation which lends itself to use in conjunction with and as a component part of an upper, lower or partial denture and which is expressly designed and adapted to be embodied therein in lieu of the customary artificial bicuspid and molar teeth. In carrying out the invention a prefabricated non-corrodible elongated bar which is preferably but not necessarily V-shaped in cross-section and open-ended is provided. This thus constructed bar provides upwardly inclined lengthwise flanges or surfaces. These surfaces converge and define a food cutting ridge. One outward surface, here designated as the buccal surface, cooperates with an opposed parallel lengthwise inward lingual surface. The outward surface is equipped with a first row of longitudinally spaced parallel integral embossments which constitutes teeth. The inward surface has a second row of spaced parallel integral embossments which are staggered with respect to the first named embossments. The second row of embossments are of a contoured shape and are distinct and different from the first named embossments. All of these embossments constitute firm reliable chewing teeth.

In carrying out a preferred embodiment of the invention the ridge which provides the vertex of the over-all bar instead of being precisely straight from end to end is longitudinally sinuous in plan in order to achieve the severance result desired.

Stated more specifically the embossments of the first row are V-shaped in cross-section, have planar outward end surfaces which are triangulate in end elevation and apical edges which are disposed at right angles to said end surfaces. Then too the apical edges are disposed in a plane substantially flush with the plane of the ridge and the spaces between the respectively adjacent teeth or embossments are wedge-shaped to provide open-ended spillways.

The embossments or teeth carried by the inwardly and downwardly sloping surface of the insert or bar are provided with convex crowns. This is achieved by utilizing embossments which are substantially semi-conoidal in cross-section, the ends thereof adjacent the ridge constituting the apical ends and the vertical ends thereof adjacent the lingual surface of the bar constituting flat basal surfaces which are flush with the lower lengthwise lingual surface of the over-all bar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view showing an approximate half-portion of a conventional type denture wherein the usual bicuspid and molar teeth (not shown) have been replaced by the teeth embodied in the improved masticating bar or insert.

FIG. 2 is a view in side elevation of the structure shown in FIG. 1 and the purpose of which is to show how the replacement tooth-equipped bar is coordinated with the above related bicuspid and molar teeth with a view toward achieving the desired improved masticating result.

FIG. 3 is a cross-section taken on a suitably enlarged scale and on the plane of the section line 3—3 of FIG. 1 looking in the direction of the indicating arrows.

FIG. 4 is a similar cross-section taken at a different point and on the plane of the section line 4—4 of FIG. 1.

FIG. 5 is a bottom plan view of the masticating bar by itself.

FIG. 6 is a view in perspective showing the front forward end at the left as is evident.

As is clear from the views of the drawing and the description, the insert lends itself to use in an upper, lower, or partial denture and is such in construction and adaptability that it is not only susceptible of being properly embodied or embedded therein but is intended to replace the customary artificial bicuspid and molar teeth that would be employed. Broadly it comprises a prefabricated non-corrodible elongated bar which, more specifically stated, could be categorized as a stainless steel bar. This bar is designed, generally stated, by the numeral 8 (FIG. 6). This bar is of requisite cross-section and length to cooperate with that portion 10 of the denture 12 shown in FIGS. 1 and 2. When properly installed it is used in opposition to either upper or lower blunt or so-called flat cusp denture teeth (FIGS. 2 and 3). The design is such that during mastication the food is cut instead of being mashed or reduced by the biting force whereby to thus afford comfort to the user during the chewing process. Then too and as will be hereinafter more fully noted the design characteristics are such as to enable the food to slide away from the cutting surfaces in a manner to avoid food build up and clogging. The four artificial which are shown are denoted at 14. Accordingly, the bar occupies the position shown at the left and beyond the end-most artificial tooth 16. This bar is substantially V-shaped in cross-section and is open at the forward end 18 and also the rear end 20. The sloping or inclined flange components of the bar are herein identified as sloping surfaces one of which is denoted as an outward or buccal surface 22 (FIG. 3) and the other companion inward surface 24 constitutes the lingual surface. The attachable open mouth of the channel of the V-shaped bar is provided inwardly of the adjacent end portions with integral rounds or crossmembers 26 which assist in embedding and mounting the over-all bar in the denture in the manner shown in FIGS. 1 and 2. The outward or buccal surface 22 is provided with transverse parallel longitudinally spaced components which are designated as bosses or embossments. All of these embossments are alike in construction and each one is denoted by the numeral 28. The converging upper united edges of the sloping surfaces 22 and 24 provide a lengthwise ridge 30 which is not only sharpened to provide a cutting edge but is sinuous in plan to add to the potential incisive cutting effects. It will be noted with respect to the embossments 28 that they constitute V-shaped teeth, that is, teeth which are V-shaped in cross-section. The upper apical edge of each tooth is not only sharpened to provide a cutting edge as at 32 but to locate the edge so that it is in a common plane with the ridge 30 and is disposed at an approximate right angle to the lengthwise axis of said ridge. The vertical face 34 of each tooth is triangulate in end elevation and is flush with the longitudinal bottoming surface 36 (FIG. 3). It should be noted in connection with these teeth that they are spaced apart equal distances and that the intervening spaces 38 are approximately wedge-shaped in plan and provide spillways. Thus, one lengthwise side of the inverted V-shaped bar provides a row of oriented and coordinating V-shaped cutting teeth 28 which are oriented and coact with the sinuous ridge 30 and also function conjointly and with requisite nicety with the embossments which are provided along the lingual surface 24. These embossments are distinctive in appearance and have rounded or convex crowns. Each embossment is denoted by the numeral 40 and in top plan is shown as being substantially semi-conoidal in delineation or configuration. The inward tapering apical end 42 of each embossment terminates proximal to the complemental ridge 30 as brought out in FIG. 6. The outer basal end 44 is flat or planar and in end elevation appears to be substantially semi-circular and is flush with the planar lingual bottoming edge portion 46. Here again it will be noted that the embossments 40 provide a row of transverse longitudinally spaced coacting teeth. The spaces between these teeth 40 are also substantially wedge-shaped in plan and are denoted by the numeral 48. It should be noted that the contour of the edge or surface 46 is one of undulated configuration. It should be further noted that the convex teeth 40 are staggered in relation to the V-shaped teeth 28 and that, in addition, the spaces 48 are staggered relative to the spaces 38. By thus orientating the features the finished bar is capable of achieving the desired incisive cutting and masticating result.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A food masticating insert for an upper, lower, or partial denture and expressly designed and adapted to be embodied therein in lieu of the customary artificial bicuspid and molar teeth comprising, a one piece prefabricated non-corrodible elongated rigid bar having upwardly inclined lengthwise surfaces converging and defining a centrally positioned longitudinally extending food cutting ridge, one lengthwise surface constituting an outward buccal surface and the other lengthwise surface constituting an inward lingual surface, said outward buccal surface having a first row of longitudinally spaced parallel integral embossments, said inward lingual surface having a second row of spaced parallel integral embossments which are staggered with respect to said first named embossments, the latter embossments being of a contoured shape distinct and different from the shape and contour of said first named embossments, all of said embossments constituting chewing teeth and serving to reduce the force needed in the mastication of food.

2. The insert defined in and according to claim 1, and wherein said ridge is uninterruptedly sinuous in plan to stabilize and minimize the bite's force, to achieve efficacious food severing results and to decrease constant trauma which causes resorption of the gum and ridges.

3. The insert defined in and according to claim 1, and wherein the embossments of said first row are each V-shaped in cross-section and (1) have planar outward end surfaces which are triangulate in end elevation and (2) have apical edges which are disposed at right angles to said end surfaces and are sharpened to provide cutting edges.

4. The insert defined in and according to claim 3, and wherein said apical edges are disposed in a plane substantially flush with the plane of said sinuous ridge, the spaces between the respectively adjacent embossments V-shaped being wedge-shaped and providing open-ended spillways transverse to the buccal surface.

5. The insert defined in and according to claim 3, and wherein the junctional corners between the triangulate surfaces and apical edges constitute sharp penetrating corners, said apical edges being positioned in a plane common with the plane of said ridge and being at right angles thereto and coordinating therewith to achieve the conjoint incisive cutting action and to avoid crushing.

6. The insert defined in and according to claim 1, and wherein the teeth-forming embossments in said second named row of embossments are semi-conoidal in plan and present and provide individual but conjointly functioning convexly contoured crown surfaces.

7. The insert defined in and according to claim 6, and wherein the apical ends of said conoidal embossments are proximal to and merge into and with a conjoint portion of the ridge, the basal ends being flush with the inward lingual surface and said lingual surface being planar.

8. The insert defined in and according to claim 7, and wherein the basal end of each semi-conoidal embossment is approximately semi-circular in end elevation, and overall row of the thus delineated embossments and spaces therebetween defining an undulated lingual surface.

9. A food masticating insert for a denture designed and adapted to replace the customarily employed artificial bicuspid and molar teeth comprising a rigid non-corrodible metal bar which is V-shaped in transverse cross-section and embodies a pair of sloping surfaces converging and providing an elongated sharp cutting ridge, said ridge being uninterruptedly sinuous in plan from end to end, the outward sloping surface constituting a buccal surface and being provided with like transverse longitudinally spaced integral embossments which are V-shaped in cross-section and provide a first row of teeth, the inward sloping surface constituting a lingual surface and being provided with like transverse longitudinally spaced integral embossments which are semi-conoidal in plan and cross-section and provide a second row of teeth complemental to the V-shaped teeth but having convexly rounded crowns, the spaces between the respective teeth being such as to provide non-clogging spillways.

10. The insert defined in and according to claim 9, and wherein the apical edges of said V-shaped teeth are not only sharp for incisive cutting but are flush with and disposed at right angles to said ridge.

References Cited

UNITED STATES PATENTS

| | | | |
|---|---|---|---|
| 1,941,735 | 1/1934 | Berry | 32—8 |
| 2,115,116 | 4/1938 | McGrane | 32—8 |
| 2,909,836 | 10/1959 | Salava | 32—2 |

ROBERT PESHOCK, Primary Examiner